July 22, 1941.  E. E. HEWITT  2,249,955
BRAKING AND PROPULSION CONTROLLER
Original Filed July 28, 1939   6 Sheets-Sheet 3
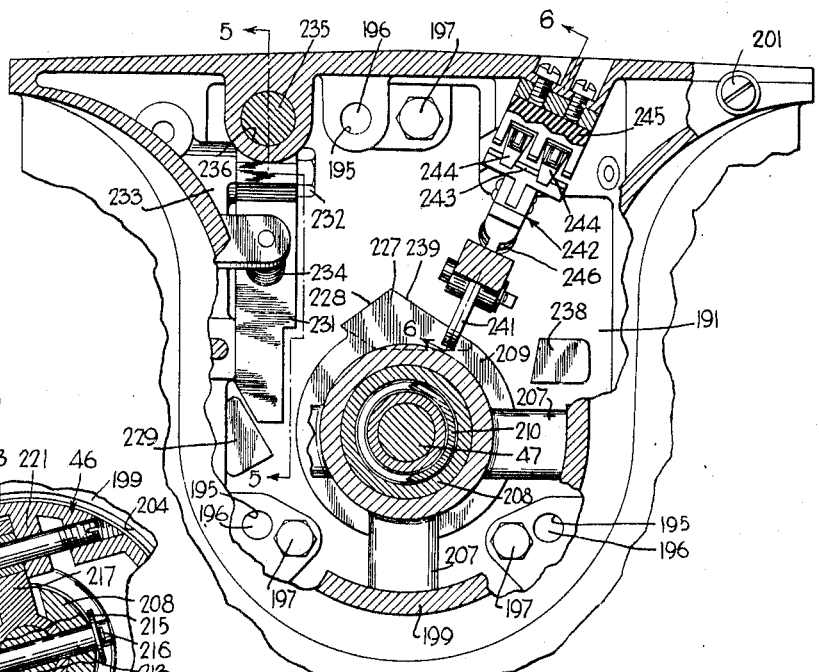
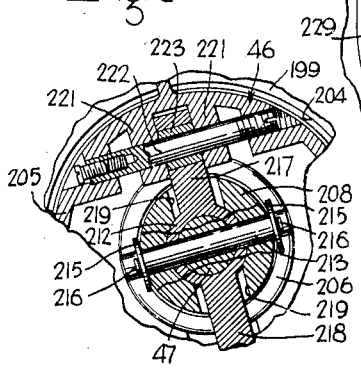
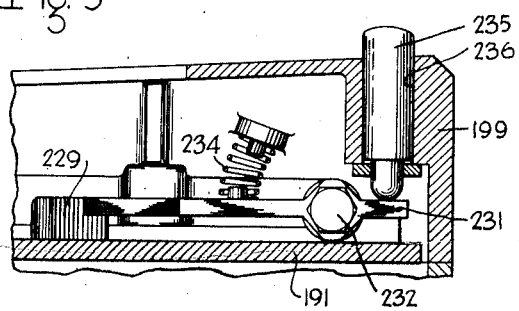
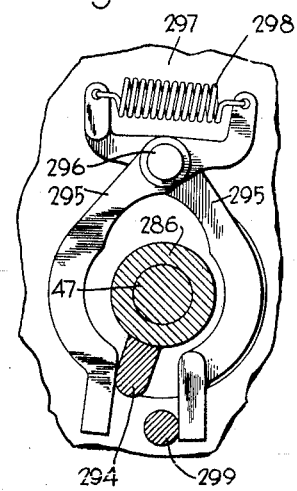
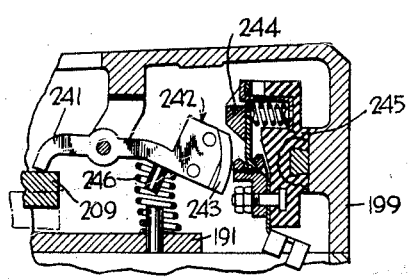
INVENTOR
ELLIS E. HEWITT
BY
ATTORNEY

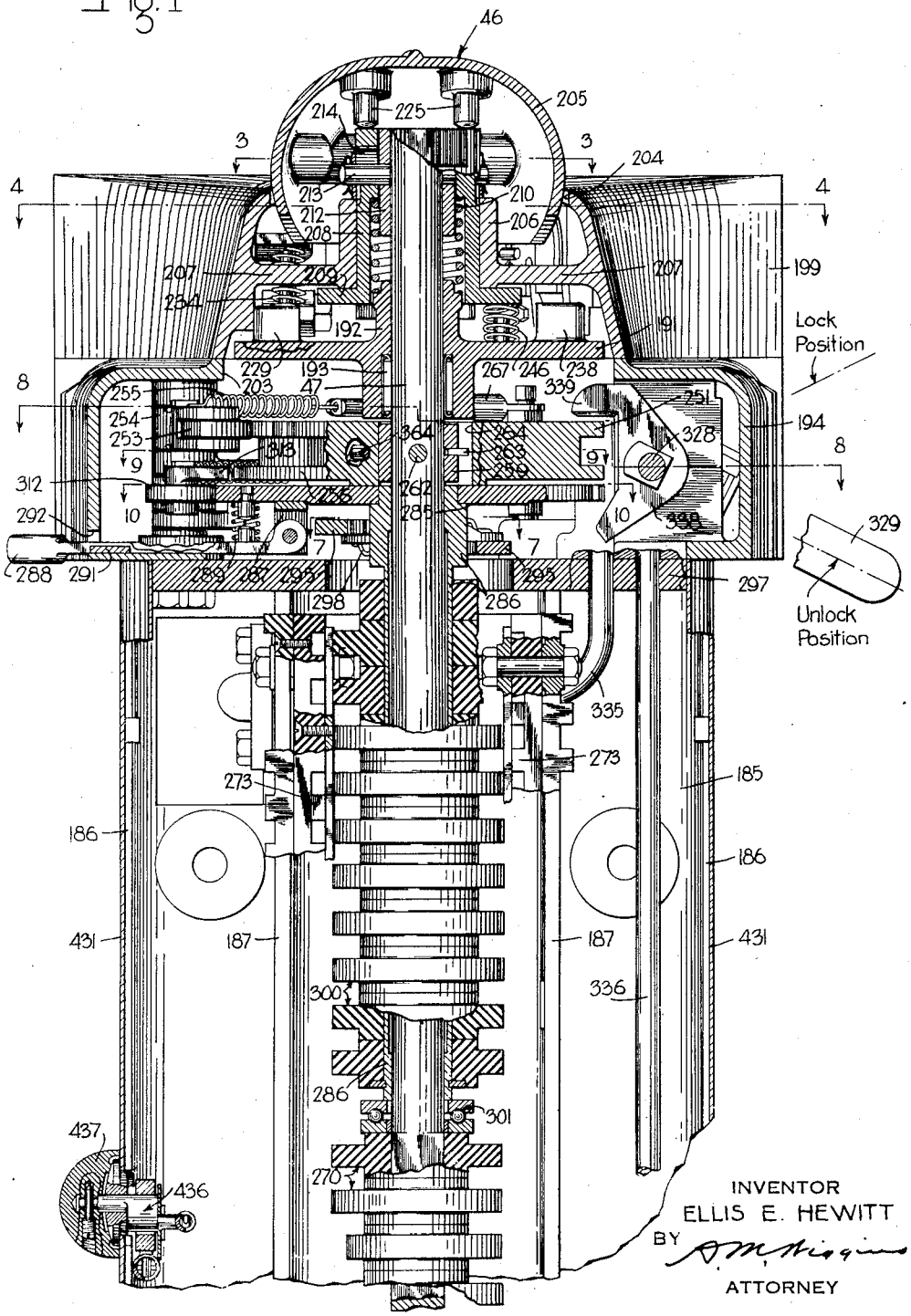

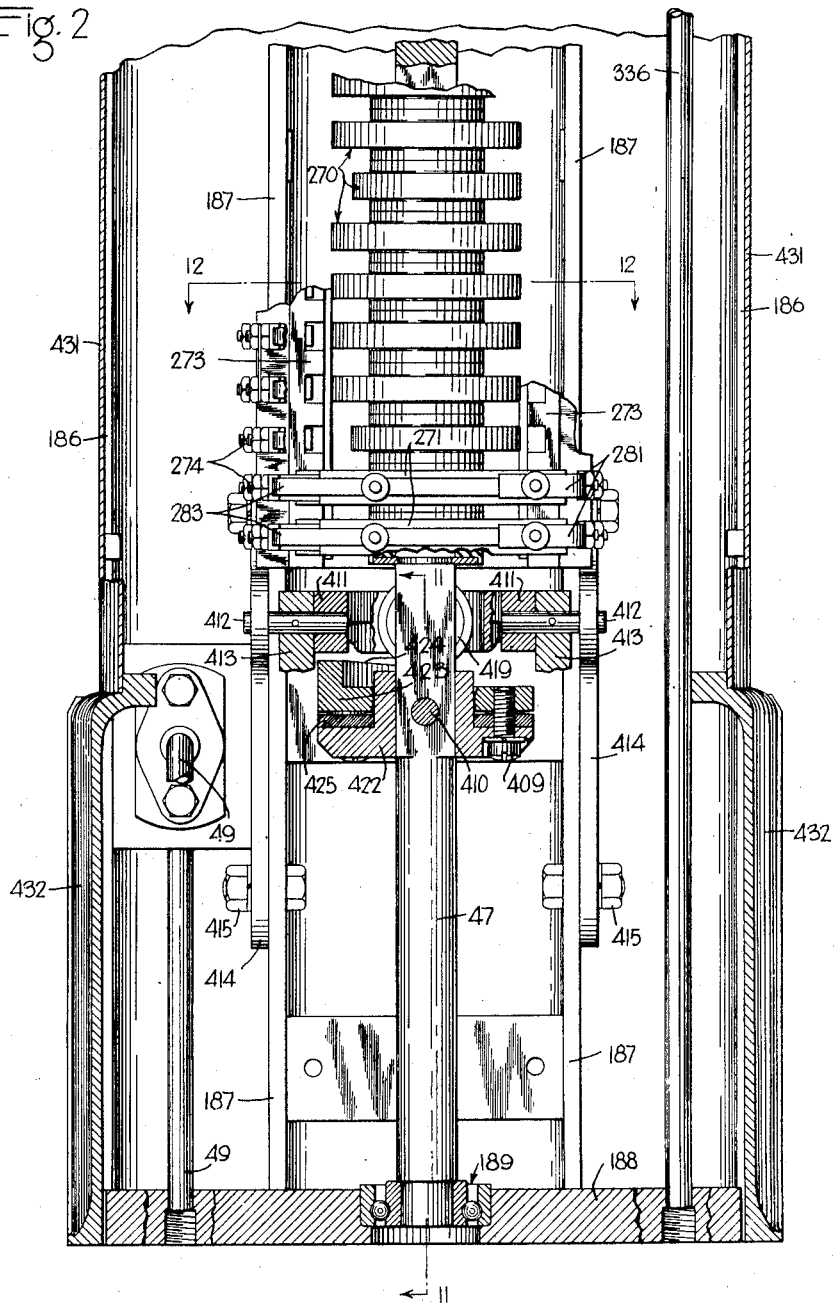

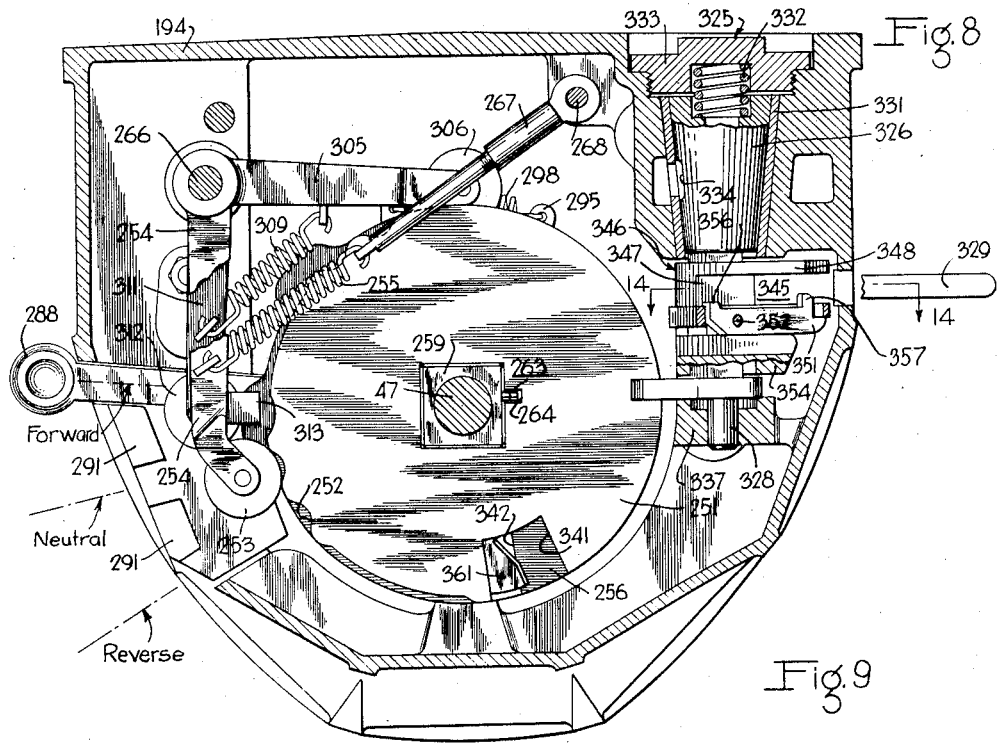
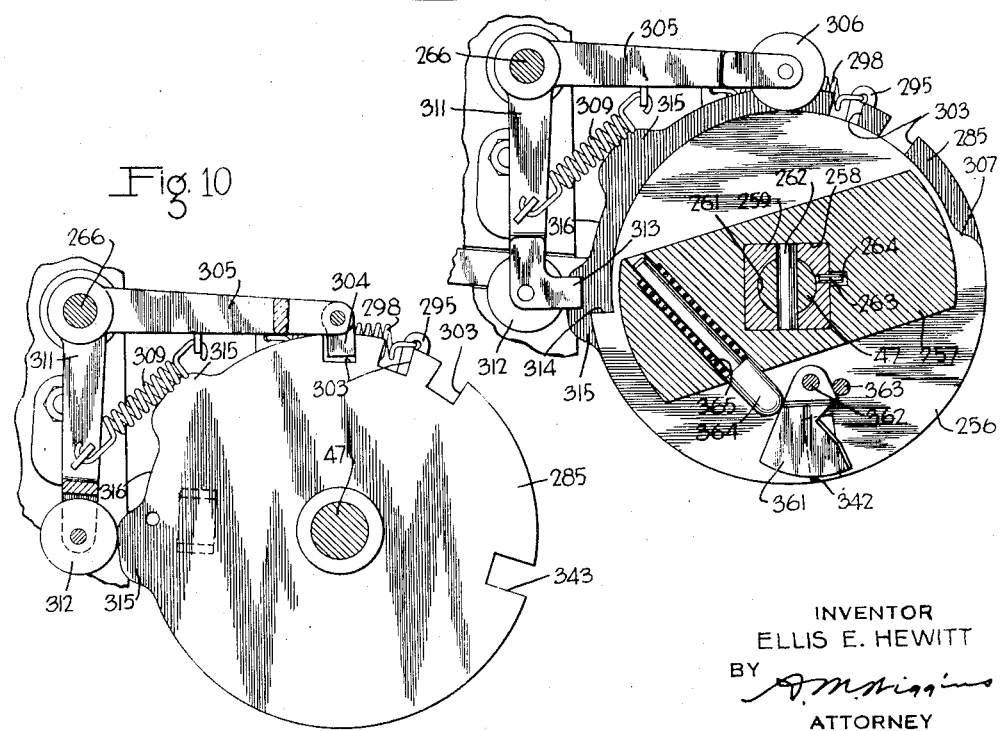

July 22, 1941.  E. E. HEWITT  2,249,955
BRAKING AND PROPULSION CONTROLLER
Original Filed July 23, 1939    6 Sheets-Sheet 5
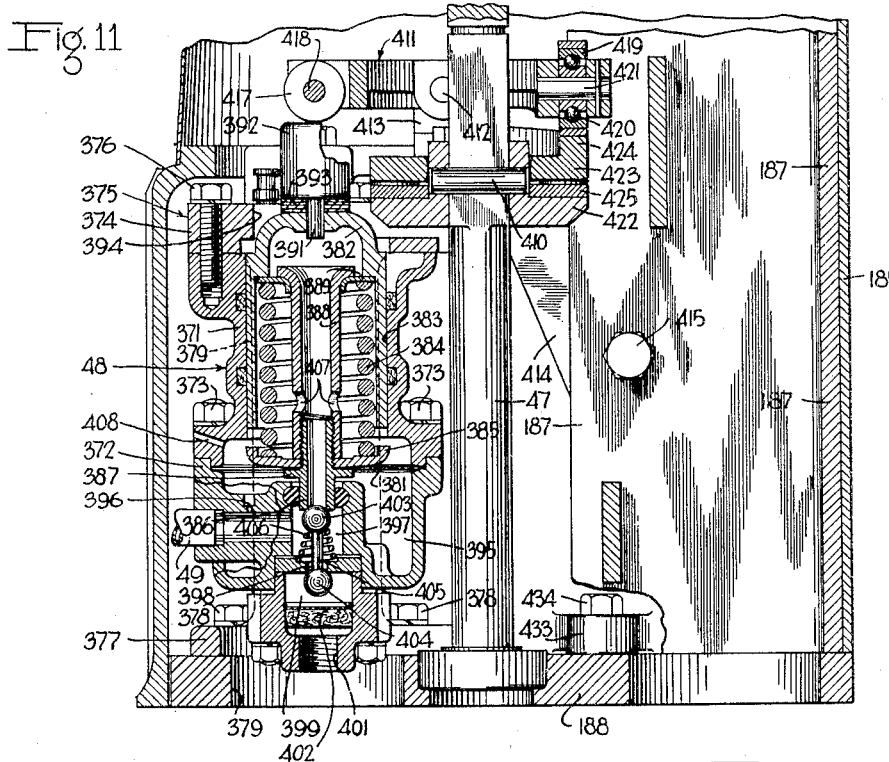
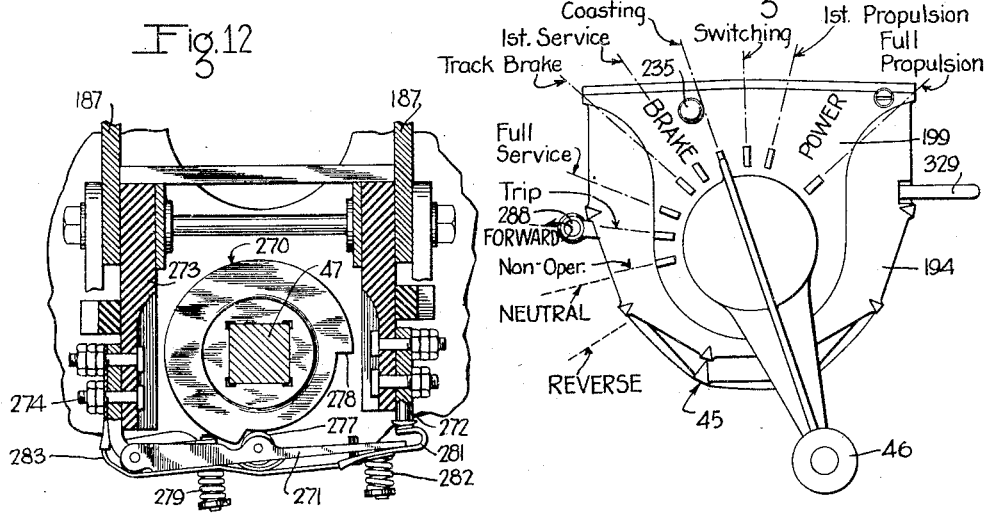
INVENTOR
ELLIS E. HEWITT
BY
ATTORNEY July 22, 1941.   E. E. HEWITT   2,249,955
BRAKING AND PROPULSION CONTROLLER
Original Filed July 28, 1939   6 Sheets-Sheet 6
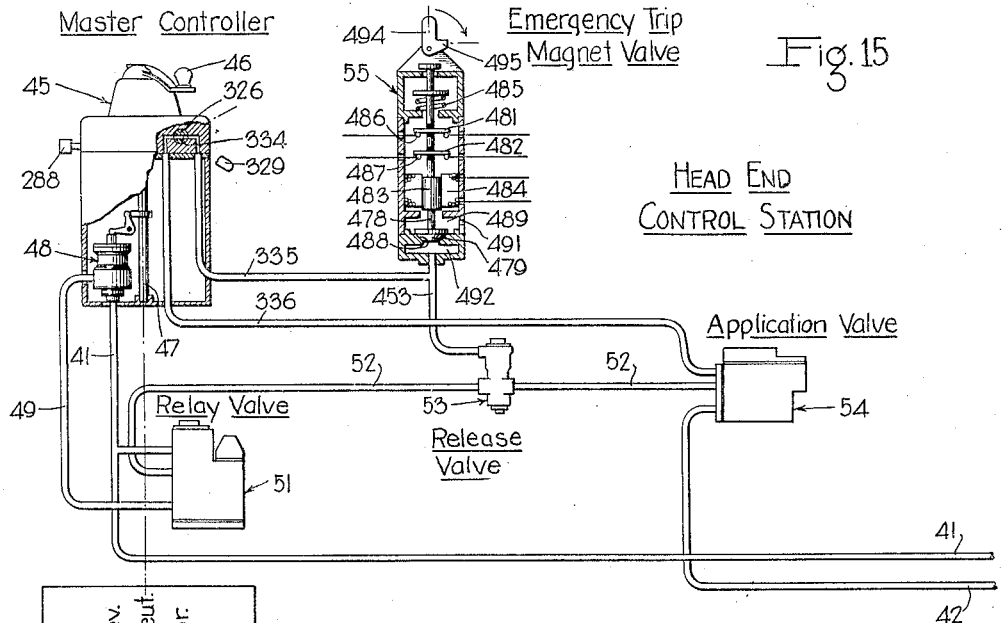
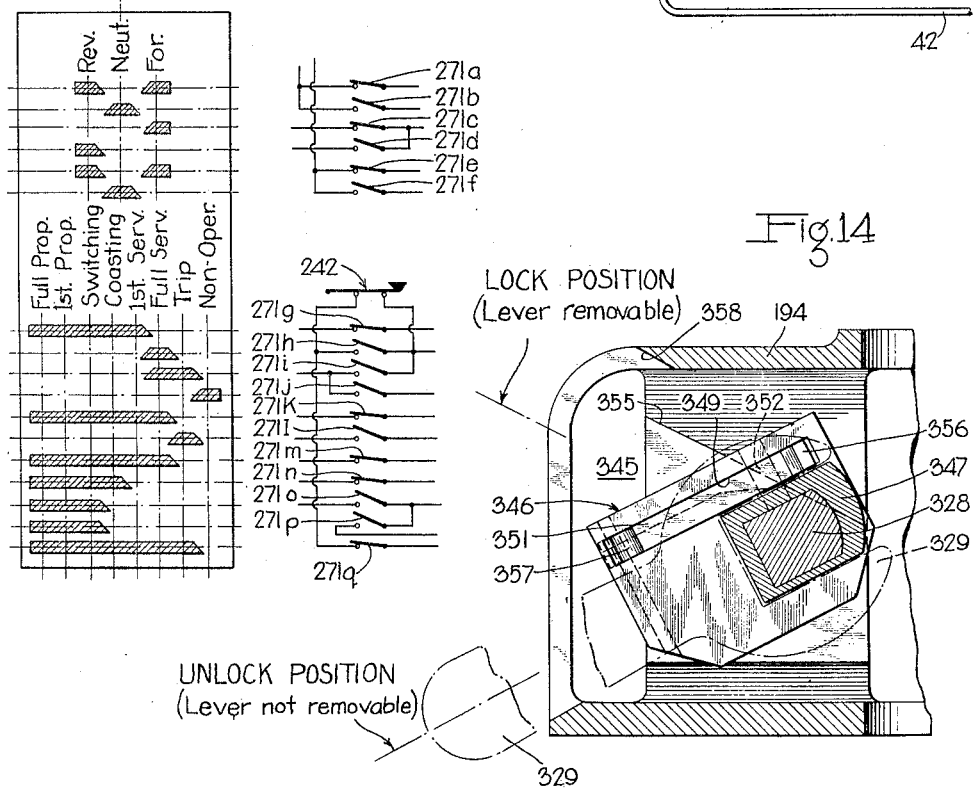
INVENTOR
ELLIS E. HEWITT
BY
ATTORNEY Patented July 22, 1941

2,249,955

UNITED STATES PATENT OFFICE 2,249,955

BRAKING AND PROPULSION CONTROLLER

Ellis E. Hewitt, Edgewood, Pa., assignor to The Westinghouse Air Brake Company, Wilmerding, Pa., a corporation of Pennsylvania Original application July 28, 1939, Serial No. 287,083. Divided and this application January 27, 1940, Serial No. 315,923

24 Claims. (Cl. 192—2)

This invention relates to braking and propulsion controllers for vehicles, such as railway cars or trains, and has particular relation to braking and propulsion controllers having a single manually operative element adapted to control braking at one time and propulsion at another time, the present application being a division of my copending application now Patent 2,215,356.

In my above-mentioned patent there is described and claimed a double-end brake and motor control system for a multiple-unit car or train of cars. Briefly, the system comprises a local brake controller and a local propulsion controller on different units or cars of the train and an actuator which is operatively controlled in response to variations of fluid pressure in a train pipe above or below a certain normal pressure to selectively operate one or the other of the controllers to a desired control position.

The local brake controller is adapted to so control the electrical connections to the propulsion motors as to cause them to function as dynamic brakes and, at the same time, serves to control magnetic track brakes. A self-lapping brake valve having a rotary operating shaft which is displaced rotarily in accordance with the displacement of the local brake controller serves to control the pressure in a brake cylinder controlling the degree of application and the release of spring-applied brakes associated with the car wheels.

The local propulsion controller controls the propulsion motors on the corresponding car or unit in accordance with the degree of displacement of the controller out of its normal or power off position.

In accordance with my present invention, I provide a "master" controller for controlling the pressure in the train pipe and also various motor, motor reversing, and brake control circuits.

Being of the double-end type, the control system employs a master controller at a head end control station and a master controller at a rear end control station, either of the controllers being adapted to control the pressure in the train pipe.

The master controller which constitutes my present invention combines in a single unitary structure of the pedestal type the necessary apparatus whereby the operator may control the brakes and the propulsion motors of the vehicle. To this end the master controller has a single controller handle non-removable normally in service adapted for "deadman" operation in all positions thereof and shiftable in a horizontal plane to opposite sides of a central position designated "coasting" position to selectively effect a reduction or an increase from a certain normal pressure in the train pipe to cause the actuators local to the several units or cars to in turn, selectively operate the associated local brake controllers or local propulsion controllers in unison.

In addition, the controller includes a so-called "master" reverser having an operating handle which is not normally removable in service.

In order to prevent improper operation or conditioning of the controller by the operator I have so designed and arranged the parts of the controller to include various safety and interlock features. These various safety and interlock features comprise:

(1) A locking lever or handle which is removable only when the controller and reverser handles are in their Non-operative and Neutral positions, respectively, and which is effective upon removal thereof to lock both handles against operation.

(2) Interlock mechanism for preventing operation of the reverser handle except in the Non-operative position of the controller handle.

(3) Interlock mechanism for preventing the movement of the controller handle out of its Coasting position in one direction into the propulsion zone thereof if the reverser handle is in its Neutral position.

(4) Mechanism for insuring hesitation of the controller handle in its Trip position.

(5) Mechanism for preventing unintended operation of the controller handle to its Trip position.

(6) Mechanism for insuring positive movement of the reverser handle to its Forward and Reverse positions from the intermediate Neutral position thereof.

It is accordingly an object of my invention to provide a combined braking and propulsion controller having a single manually operative handle adapted to control braking at one time and propulsion at another time.

Another object of my invention is to provide a combined braking and propulsion controller embodying a master reverser and the above-mentioned various interlock and safety features whereby to insure the proper coordinated operation or conditioning of the controller handle and of the reverser handle.

The above objects as well as other objects which will be made apparent hereinafter, are obtained by means of an embodiment of my invention subsequently to be described and shown in the accompanying drawings wherein, Figs. 1 and 2, when placed together in vertical alignment, constitute a vertical sectional view of the master controller embodying my invention, it being understood that the controller handle is shown in its Coasting position and raised to "deadman" application position while the master reverser handle is shown in its "Forward" position, Figs. 3 and 4 are horizontal sectional views taken on the lines 3—3 and 4—4, respectively, of Fig. 1, Figs. 5 and 6 are vertical sectional views taken on the lines 5—5 and 6—6, respectively, of Fig. 4, Fig. 7 is a fragmental sectional view taken on the line 7—7 of Fig. 1, showing a position-insuring means for the master reverser handle.

Figs. 8, 9, and 10 are horizontal sectional views taken on the lines 8—8, 9—9, and 10—10, respectively, of Fig. 1, showing further details of construction, Fig. 11 is a fragmental vertical sectional view taken on the line 11—11 of Fig. 2, Fig. 12 is a fragmental horizontal sectional view taken on the line 12—12 of Fig. 2 showing the construction of and manner of mounting the cam-operated switch contact fingers of the controller, Fig. 13 is a plan view, on reduced scale, of the controller, showing the various control positions of the controller and reverser handles, Fig. 14 is a fragmental vertical sectional view, taken on the line 14—14 of Fig. 8 showing the locking mechanism whereby the locking lever can be removed from the controller in only one position, Fig. 15 is a fragmental diagrammatic view showing illustrative pneumatic connections to the controller and the sequence of operation of the cam-operated switches of the controller.

Description

For simplicity, the controller constituting my present invention is shown independently of the braking and propulsion system with which it is employed except for the pneumatic connections indicated in Fig. 15. In the subsequent description of the controller, general reference may be made to parts of the system not shown in order to render the operation of the controller understandable. It is believed that the construction and the operation of the controller will be clear without a specific illustration of the control system in detail. If it is desired, however, reference may be had to my Patent 2,215,356 for a complete description of the control system and the operation of my present controller therein.

Referring to Figs. 1 and 15, it will be seen that the braking and propulsion controller 45 constituting my present invention, and hereinafter referred to simply as the controller, is provided with a controller handle 46 at the top thereof which is shiftable in a horizontal direction to effect rotation of a vertically extending rotary operating shaft 47. Secured to the lower end of shaft 47 are a series of rotary cams 270 for operating stationarily mounted switch contact fingers 271g to 271q respectively. Associated with the lower end of shaft 47 is a self-lapping valve device 48 which is operated in accordance with the rotary position of the shaft 47 in the manner to be hereinafter more fully described.

The controller also comprises a master reverser handle 288 which is adapted to rotate a tubular reverser shaft 286 on which a series of rotary cams 300 are fixed for operating associated switch contact fingers 271a to 271f.

The various operating positions of the controller handle 46 and reverser handle 288 are indicated in Fig. 13. As shown in Fig. 13, the controller handle 46 is in the Coasting position thereof.

When the controller handle 46 is shifted in a counterclockwise direction from the position shown it enters the so-called "Brake" zone. As will be apparent in Fig. 13, the increasing displacement of the controller handle in a counterclockwise direction from the Coasting position causes it to traverse successively a number of positions designated respectively, in the order reached, First service, Full service, Trip and Nonoperative positions. The position of the controller handle 46 at which application of the magnetic track brake is initiated is designated Track brake and is located between the First and Full service positions.

When the controller handle 46 is shifted in a clockwise direction from the Coasting position, it enters the so-called "Power" zone. The first position reached by the controller handle 46 in its movement into the Power zone is designated Switching. In this position, the propulsion motors of the car or train are so controlled as to operate at a predetermined low speed suitable for switching operations of the car or train in track yards. The second position attained by the controller handle in the Power zone is designated First propulsion. As the displacement of the controller handle in clockwise direction beyond the First propulsion position increases, the handle traverses a zone in which the rate of propulsion increases progressively to a position at the extremity thereof designated Full propulsion.

The reverser handle 288, as shown in Fig. 13, has three positions respectively designated Forward, Neutral, and Reverse, the handle being shown in the Forward position thereof.

The above general description of the controller has been given in order to provide a general comprehension of the construction thereof. The controller will now be described in detail.

As previously indicated, the controller is of the pedestal type and is adapted to be mounted in an upright position in a control cab or control station of a car. The controller has a vertically disposed base plate in the form of a steel channel member 185. Another steel channel member 187 is secured to the web of the channel member 185 midway between the two side flanges 186 of the channel member 185.

As seen in Figs. 2 and 11, a bottom base plate 188 is suitably attached, as by welding, to the lower end of the channel member 185. Supported in the base plate 188 is a bearing member 189 of the ball-bearing type in which the lower end of the operating shaft 47 of the controller is rotarily supported and held in a position substantially midway between the flanges of the centrally disposed channel member 187.

The operating shaft 47 is supported and guided at its upper end by an upper bearing plate 191 (see Fig. 1) that has a hub portion 192 provided with a sleeve bearing 193 through which the shaft 47 extends. The bearing plate 191 is secured to a portion 194 of the casing, made of cast iron or aluminum, that is bolted or screwed to the upper end of supporting channel member 185. As shown in Fig. 4 the bearing plate 191 is provided with three circular holes 195 into which dowel pins 196 formed on the casing member 194 extend to accurately position the bearing plate. A plurality of screws 197 are provided for securing the bearing plate to the casing member 194.

Another casing member 199, complementary to the casing member 194 is attached to the upper surface of the casing member 194 as by a bolt or screw 201 accessible from the outside and several other screws not shown.

The casing member 199 is U-shaped in plan view, (see Fig. 13) being open at the bottom and formed so as to cover the central opening 203, in the upper surface of the casing member 194, through which the upper end of the operating shaft 47 projects. The upper surface of the casing member 199 is provided with a circular opening 204 in which is received a spherical portion 205 formed on the end of the operating handle 46 for attachment to the upper end of the operating shaft 47 which projects upwardly through the central opening 204.

As shown in Fig. 1, the casing member 199 has an integrally formed hub 206 that is attached by a plurality of webs 207 to the wall of the casing member in a position such that the operating shaft 47 extends therethrough.

Vertically slidable in the hub 206 is a bushing member 208 that is provided at the lower end thereof with a flange 209 that extends radially outward from the shaft 47.

Interposed between the upper end of the hub portion 192 of the bearing plate 191 and a shoulder formed on the interior of the bushing 208 is a coil spring 210 that urges the bushing upwardly to effect engagement of the flange 209 with the lower end of the hub 206.

Fitting closely in slidable relation over the upper end of the operating shaft 47 is a collar 212, the outer circular surface of which fits closely and slidably within the inner circular opening of the bushing 208 (Fig. 3). A pin 213 extends diametrically through a suitable hole in the shaft 47 and cooperating holes in the walls of the collar 212 for securing the collar 212 to the shaft 47. The bushing 208 is provided with elongated openings 214 at diametrically opposite points therein through which the opposite outer ends of the pin 213 extend, suitable washers 215 and cotter pins 216 being provided on the ends of the pin 213 for holding it in position.

The collar 212 is provided with two oppositely extending arms 217 and 218 respectively that are substantially perpendicular to the pin 213 and are received in suitable notches or recesses 219 in the upper end of the wall of the bushing 208. The end of the arm 217 on the collar 212 is received between a pair of lugs 221 formed on the inner surface of the spherical portion 205 of the operating handle 46 and a screw 222, inserted transversely from the outside of and through the wall of the spherical portion 205, extends through the lugs 221 and suitable bearing 223 provided in the arm 217 to provide a pivot for the operating handle.

On the inner surface of the spherical portion 205 is formed a pair of lugs 225 that are so located as to engage the upper end of the bushing 208 on diametrically opposite sides of the operating shaft 47. Thus when the outer end of the controller handle 46 is pressed downwardly by the operator, the bushing 208 is correspondingly urged downwardly against the yielding resistance of the spring 210 and, conversely, when the outer end of the handle is released, the spring 210 returns the handle upwardly to the position shown in Fig. 1. This movement of the operating handle provides the well-known "deadman" emergency application feature.

It will be seen that the elongated openings 214 in the bushing 208 permit the bushing to be shifted downwardly with respect to the operating shaft 47 but, due to the pin 213 extending in close fitting relation through the openings 214, the bushing 208 is fixed to rotate with the operating shaft 47 at all times.

The flange 209 on the bushing 208 has a V-shaped projection 227 thereon (Fig. 4) one surface 228 of which is so disposed as to engage a cooperating surface on a stop lug 229 formed on the bearing plate 191 to limit the rotation of the operating shaft 47 in a counterclockwise direction. As will be apparent hereinafter, this position corresponds to the Non-operative position of the controller handle 46.

In order to prevent the accidental and undesired rotation of the controller handle 46 beyond the Full service position thereof, a blocking lever 231 is provided (see Figs. 4 and 5). Lever 231 is pivoted on a screw 232, screwed into a boss 233 formed on the inner surface of the casing member 199, and is normally biased by a coil spring 234 to a position in the plane of rotation of the flange 209 of the bushing 208 so that the edge of the lever is engaged by the surface 228 on projection 227 of the flange 209 to prevent the movement of the controller handle 46 beyond its Full service position.

In order to enable the movement of the controller handle 46 beyond its Full service position in a counter-clockwise direction, as seen in Fig. 4, a push-button or plunger 235 that operates in a suitable bore 236 in the casing member 199 and that projects above the upper surface of the casing member 199 sufficiently to be depressed by the operator is arranged so that when depressed by the operator, it engages an arm of the lever 231 and rocks the lever 231 in a clockwise direction, as seen in Fig. 5, to a position out of the plane of movement of the flange 209 on the bushing 208. It will thus be seen that unless the operator depresses the push-button 235, the controller handle 46 cannot be shifted beyond its Full service position. As previously explained, the Trip position of the controller handle 46 is located between the Full service position and the Non-operative position (see Fig. 13) and the blocking lever 231 thus positively prevents the undesired operation of the controller handle to Trip position unless the operator definitely intends such movement of the controller handle.

As seen in Figs. 1 and 4, the bearing plate 191 is also provided with a stop lug 238 that is adapted to be engaged by another surface 239 of the projection 227 on the flange 209 of the bushing 208 when the operating shaft 47 and controller handle 46 are shifted in a clockwise direction from the position shown in Fig. 4. As will be seen later, the position of the controller handle as limited by the engagement of the projection 227 with the stop lug 238 corresponds to the Full propulsion position of the controller handle.

The flange 209 of the bushing 208 cooperates with one end of a pivoted switch lever 241 of a switch device, hereinafter designated the "deadman" switch 242, as seen in Figs. 4 and 6. With the controller handle 46 released and the bushing 208 correspondingly urged to its uppermost position, the flange 209 causes the switch lever 241 to be rocked in a clockwise direction to effect disengagement of a contact-bridging member 243, fixed in insulated relation on the opposite end of the switch lever from a pair of contact members 244 suitably carried on an insulating block 245 mounted on the inner wall of the casing member 199. When the controller handle is depressed, the flange 209 on the bushing 208 assumes a position, indicated by the broken lines in Fig. 6, and a coil spring 246 interposed between the bearing plate 191 and the contact arm of the switch lever 241 urges the switch lever in a counterclockwise direction to effect the engagement of the contact-bridging element 243 with the contact members 244, thus closing the switch.

The various operating positions of the controller handle 46 are positively defined by means of a disk 251 (see Fig. 8) fixed to the upper end of the operating shaft 47 and having suitable notches 252, in the peripheral edge thereof for receiving a roller 253 that is rotatably mounted on the end of a lever 254 and yieldingly biased into contact with the peripheral edge of the disk 251 by a coil spring 255.

As seen in Figs. 1 and 9, the positioning disk 251 is formed integrally with a second disk 256, the two disks being joined by an intervening boss 257 of substantially rectangular cross section. A central opening 258 of square shape extends through the disks 251 and 256 and the boss 257 for receiving a square bushing 259 that has a central bore 261 of circular cross section conforming closely to the outer circular diameter of the controller shaft 47. The bushing 259 is fixed on the shaft 47 by a transversely extending pin 262. In order to insure the disks 251 and 256 being fitted over the square bushing 259 in only one position, a pin 263 is provided in the wall of the bushing which extends into a suitable groove or slot 264 formed in the disks and connecting boss 257. Thus the disks 251 and 256 are prevented from being installed in improper angular relation to the controller handle 46.

As seen in Figs. 1 and 8, the lever 254 carrying the roller 253 is pivoted at the end opposite the roller 253 on a suitable bolt or stud 266 suitably secured in the casing member 194 in parallel relation to the controller shaft 47. The biasing spring 255 is connected at one end to a lug on the lever 254 and at the opposite end to a rod 267 that is pivoted, as on a pin 268, mounted on the inner surface or wall of the casing member 194.

A portion of the operating shaft 47, intermediate the ends thereof and some distance below the casing member 194, is of square cross section for receiving thereon in interlocked relation the previously mentioned rotary cams 270. Cams 270 have central openings of square shape corresponding to the cross section of the operating shaft. As indicated in Fig. 12, each cam 270 is adapted to operate a corresponding contact finger 271 into and out of contact with a fixed contact member 272 according to the contour of the rotary cam. The contact fingers 271 are hinged in spaced parallel relation to a supporting board of insulating material 273 that is secured to one flange of the inner channel member 187, a suitable terminal post 274 being provided for connecting electrical wires to the contact fingers. In a similar manner contact members 272 are mounted on a board of insulating material 274 suitably secured to the opposite flange of the central channel member 187.

As will be seen in Fig. 12, each contact finger 271 is provided with a roller 277 that engages the peripheral edge of the rotary cam 270. When the roller 277 engages in a notch 278 in the peripheral edge of the cam, a spring 279 becomes effective to urge the contact finger 271 into engagement with the fixed contact member 272. When the roller 277 engages the outer rim or edge of the cam 270, the finger 271 is shifted out of contact with the fixed contact member 272 against the yielding force of the spring 279. If desired, a yielding contact tip 281 having an associated biasing spring 282 may be provided on the contact fingers 271, in the manner shown, thereby enabling an electric wire 283 to be connected directly to the contact tip 281 and avoiding the necessity of electric current passing through the contact finger 271 itself.

The specific contour of each of the rotary cams 270 will be apparent from the diagrammatic development view of the controller cams shown in Fig. 15. Each rotary cam 270 is represented by a corresponding cam element and the contact finger operated by the cam is located in a horizontal line opposite the cam element. When the controller handle 46 is in a position covered by the cam element, the corresponding contact finger is in closed position. Conversely, when the controller handle is in a position not covered by the cam element, the corresponding contact finger is in open position.

The series of contact fingers 271, descending from the top, are identified in Fig. 15 by the reference numerals 271 and the suffix letters "g" to "q" respectively. Only eleven contact fingers 271g to 271q are shown in Fig. 15, while thirteen rotary cams 270 are shown in Figs. 1 and 2. This apparent discrepancy is due to the fact that the two rotary cams 270 at the bottom of the series and the associated contact fingers are not employed but are available for any desired future use.

By way of illustration, now, consider the uppermost rotary cam 270. As seen in Fig. 15 the cam element corresponding thereto covers the Coasting position of the controller handle 46 and with the controller handle in Coasting position as assumed, the contact finger 271g is thus shown in closed position.

The specific function of the contact fingers 271g to 271q is not necessary to an understanding of my present invention and it is deemed sufficient therefore merely to state that these contact fingers function in connection with the braking and propulsion circuits.

As previously intimated, the master controller 45 has embodied therein a master reverser. As seen in Fig. 1, the master reverser parts include a reverser disk 285 having a tubular sleeve 286 attached in a central position thereto as by welding, the controller shaft 47 being adapted to extend through the sleeve and disk. On the lower surface of the reverser disk 285 is fixed a yoke bracket 287 between the two arms of which is received the inner end of a reverser handle 288 that projects out of the side of the casing member 194 through an opening 292. A coil spring 289 interposed between the underside of the reverser disk and the reverser handle 288 biases the reverser handle downwardly, thus necessitating the lifting of the reverser handle to override projections 291 on the lower side of opening 292 in order to shift the reverser handle to its different operating positions.

As previously explained, the reverser handle 288 has three positions, designated respectively Forward, Reverse and Neutral. When the handle 288 is shifted in a counter-clockwise direction over the first lug 291, from the Forward position in which it is shown in Fig. 8, the handle enters the Neutral position thereof. Further shifting of the reverser handle in a counterclockwise direction over the second lug 291 causes the handle to enter the Reverse position thereof.

In order to insure that the reverser handle 288 be moved positively out of the Neutral position into the Forward or Reverse positions thereof, an arrangement shown in Fig. 7 is provided for yieldingly resisting the rotation of the reverser disk 285 out of Neutral position. The tubular sleeve 286 attached to the reverser disk 285 is provided with a radially extending tongue 294 which is adapted to engage one or the other of two crossed levers 295 that have a common pivot pin 296 attached to an upper base plate 297 (Fig. 1) just beneath the casing member 194. A coil spring 298 is connected at its opposite ends to corresponding ends of the two crossed levers 295 to cause the ends of the levers on the opposite side of the pivot pin 296 to engage diametrically opposite sides of a stop pin 299 formed on the upper base plate 297.

When the reverser handle 288 is in its Neutral position, the tongue 294 is in line with the axis of the controller shaft 47 and the stop pin 299. When the reverser handle is shifted to the Forward position thereof, the tongue 294 engages the left-hand lever 295, as seen in Fig. 7, and rocks it on the pivot pin 296 against the yielding resistance of the spring 298, the other lever 295 being held against rotation due to the engagement of the free end thereof with the pin 299. Similarly, if the reverser handle 288 is shifted from the Neutral position to its Reverse position, the tongue 294 is shifted in a counterclockwise direction, as seen in Fig. 7, to engage the free end of the right-hand lever 295 to correspondingly rock the lever against the resistance of the spring 298.

It will thus be apparent that the reverser handle 288 must be moved fully past the intervening lug 291 between Neutral position and either Forward or Reverse position so that the lug may hold the lever displaced out of Neutral position against the force of the spring 298. Thus positive and full movement of the reverser handle to either Forward or Reverse position is assured.

The tubular sleeve 286 attached to the reverser disk 285 has an outer contour of square cross section and the previously mentioned plurality of rotary cams 300, having conforming central square openings, are received over the sleeve and correspondingly locked thereto for rotation with the reverser disk. The rotary cams 300 are adapted to operate respectively associated contact fingers 271 in a manner similar to that of the rotary cams 270.

The specific contour of the different reverser cams 300 will be apparent from the diagrammatic development view thereof shown in Fig. 15. Just as in the case of the rotary cams 270, so in the case of the cams 300, the cams are indicated by cam elements and the contact fingers operated by the cams are in horizontal line opposite the respective cam elements. When the reverser handle 288 is in a position covered by a cam element, the corresponding contact finger is in closed position. Conversely, when the reverser handle 288 is in a position not covered by a cam element, the corresponding contact finger is in open position.

The contact fingers associated with the rotary reverser cams 300 are identified in Fig. 15 descending from the top cam, by the reference numeral 271 with the suffix letters "a" to "f," inclusive, respectively. The function of the switches formed by the contact fingers 271a to 271f is not necessary to an understanding of my present invention and it is deemed sufficient therefore to state that they serve to control the circuit connections of the propulsion motors to effect forward or reverse travel of the car or train.

A suitable bearing member 301, preferably of the ball type as shown, is provided between the uppermost rotary cam 270 and the lower end of the tubular sleeve 286 of the reverser disk 285 to afford the necessary vertical support for the reverser disk, sleeve 286 and the rotary cams 300 attached thereto.

In order to prevent the accidental or unintended operation of the reverser handle 288 out of any of its positions except when it is safe to do so, the reverser handle is positively locked against movement in all positions of the controller handle 46 except the Non-operative position. To accomplish this, the reverser disk 285 is provided with three rectangular notches 303 (Fig. 10) into which a locking finger 304 formed on or attached to the end of a lever 305 is adapted to be received. The lever 305 is pivoted on the bolt 266 immediately below the lever 254 and, at the end having the locking finger 304, it is formed as a clevis in which a roller 306 is rotatably mounted. The roller 306 is adapted to engage the outer peripheral cam surface of the disk 256 formed integrally with the positioning disk 251.

The peripheral cam surface of the disk 256 has a cam 307 formed thereon in such a position as to engage the roller 306 and shift it radially outwardly from the controller shaft 47 only when the controller handle 46 reaches the Non-operative position thereof. When the roller 306 is shifted radially away from the controller shaft by the cam 307, the locking finger 304 is shifted correspondingly outward so as to clear the rim of the reverser disk 285 and thus permit rotation of the disk by the reverser handle 288 to a desired position. In Fig. 10, the reverser disk 285 is shown in the position corresponding to the Forward position of the reverser handle 288 and, accordingly, since the disk 256 is in a position corresponding to the Coasting position of the controller handle 46, the locking finger 304 is received in the notch 303 that corresponds to the Forward position of the reverser handle.

The lever 305 is yieldingly biased in a direction to maintain the roller 306 in contact with the rim of the disk 256 by a coil spring 309. One end of the spring 309 is secured to a lug formed on the lever 305 and the other end is secured to a similar lug formed on another lever 311 that is pivoted on the pivot bolt 266 immediately below the lever 305. The lever 311 has a clevis at the outer end thereof in which is rotatably mounted a roller 312, the roller being rotatable in the plane of the reverser disk 285. It will thus be seen that a single spring 309 serves to yieldingly bias the rollers 306 and 312 into contact with the rims of the respectively associated disks 256 and 285.

In order to prevent the operation of the controller handle 46 out of its Coasting position into a propulsion position if the reverser handle 288 is in its Neutral position, the lever 311 is provided with a locking finger 313 (Fig. 9) at one side of the roller 312 which is adapted to be swung into the path of movement of a shoulder 314 formed at the outer periphery of the disk 256 when the reverser handle 288 is in its Neutral position. In order to effect movement of the locking finger 313 into and out of the path of movement of the shoulder 314 on the disk 256, the reverser disk is provided with a pair of cams 315 arranged in spaced circumferential relation and adapted to engage the roller 312 so as to shift the lever 311 pivotally on the bolt 266 as seen in Figs. 8, 9 and 10. When the reverser handle 288 is in its Neutral position, the position of the reverser disk is such that the roller 312 on the lever 311 is received in the notch 316 formed between the two cams 315, and the spring 309 accordingly biases the lever 311 radially inwardly toward the controller shaft 47 to move the locking finger 313 into path of the shoulder 314. As seen in Fig. 9, the disk 256 is in the position corresponding to the Coasting position of the controller handle 46. Thus, if the locking finger 312 is swung into the path of shoulder 314 on disk 256, the disk 256, and correspondingly the controller handle 46, is blocked against rotation in a clockwise direction. With the reverser handle 288 in its Neutral position, therefore, the controller handle 46 cannot be operated out of Coasting position in a clockwise direction into the propulsion zone.

Since the controller handle 46 and the reverser handle 288 remain on the controller at all times while the equipment is in service, it is necessary to provide some mechanism for locking the controller handle and reverser handle against undesired operation when the operator leaves the control station at which the master controller 45 is located, for some reason such as changing ends or at the end of a service run. Since the equipment is of the double-end type, it is also necessary to provide some means for closing the end of the previously mentioned control pipe at the control station opposite to that at which the operator is located. I have accordingly provided a novel arrangement shown in Fig. 8 whereby these two necessary functions are performed by a combined valve and locking mechanism 325.

The mechanism 325 comprises a plug type valve or cock 326 provided with a stem 328 with which a removable operating lever or handle 329, in the form of a wrench, is adapted to cooperate to effect rotation of the valve 326 through an angle between two extreme positions. The plug valve 326 has a tapered body which is adapted to be seated on a correspondingly tapered bushing 331, secured in a suitable bore in the casing member 194 open to the back side of the controller 45. A coil spring 332 is interposed between the outer end of the plug valve 326 and a screw plug 333, screwed into the outer threaded end of the bore that receives the valve bushing 331, and urges the plug valve 326 into sealing contact with the bushing 331.

The body of the plug valve 326 is provided with a suitable port or cavity 334 therein for opening and closing communication between two pipes 335 and 336, as shown in Figs. 1 and 15, leading respectively to a valve device, hereinafter called the emergency trip magnet valve 55, and to a valve device hereinafter called the application valve 54, for a purpose which will be explained hereinafter.

As shown in Fig. 8, the inner end of the stem 328 of the plug valve 326 is journaled in a suitable bearing formed on the inner surface of the casing member 194 and, fixed to the stem 328 adjacent the bearing 337, is a locking latch or pawl 338. The latch 338 is fixed on the valve stem 328 in such manner that when the locking lever 329 is operated downwardly to the position designated "Unlock" in Fig. 1, a finger 339 on the latch 338 is shifted above the disk 251 thus enabling rotation of the disk 251 and consequently operative movement of the controller handle 46.

Since it is desired to have the controller handle locked in its Non-operative position and the reverser handle 288 in its Neutral position, the disks 251, 256 and 285 are severally provided with rectangular notches or slots 341, 342 and 343, respectively, (Figs. 8, 9 and 10) cut radially inward from the outer periphery of the disks and adapted to be in vertical alignment or registry to receive the latch finger 339 when the controller handle 346 is in Non-operative position and the reverser handle 288 is in Neutral position.

In order to prevent removal of the locking lever 329 except when the latch 338 is in a position to lock the controller handle 46 and the reverser handle 288 against movement, a locking device 345 is provided for the locking lever 329 as shown in Figs. 8 and 14. This locking device comprises a base block 346, fixed on the valve stem 328 as by having a square opening conforming to a square portion of the stem 328, the block 346 having a square portion 347 of reduced cross section connecting two spaced flanges 348 arranged perpendicularly with respect to the valve stem 328. The locking lever 329 extends through a suitable vertical slot 358 in the side of the casing member 194 and interlocks with the square portion 347 to cause turning of the valve stem 328, as indicated by the broken lines in Fig. 14.

One of the flanges 348 has a slot 349 cut therein in which is received a locking pawl 351, the pawl 351 being pivoted on a pin 352 fixed in the flange 348 and extending across the slot 349.

The casing member 194 has a partition or wall 354, through which the valve stem 328 extends, located between the locking latch 338 and the base block 346 and having a surface closely adjacent to the flange 348 carrying the locking pawl 351. The wall 354 has a portion cut away on a line 355 (see Fig. 14) so that when the locking lever 329 is in its upper or "Lock" position, the locking pawl 351 is free to rock on its pin 352.

The locking pawl 351 is provided at the opposite ends thereof with projecting cams 356 and 357 that project into the path of the locking lever 329 as it is inserted through the slot 358 in the side wall of the casing member 194. If the locking pawl 351 is free to pivot on its pin 352, the jaw portion of the locking lever 329 engages the cam 357 and rocks the locking pawl 351 inwardly to permit the locking lever to be further inserted inwardly. When the jaw portion of the locking lever 329 is received on the square portion 347 of the base block 346, the jaw portion of the lever engages the cam 356 at the other end of the locking pawl 351 and rocks the pawl 351 back to its original position. As long as the locking lever 329 remains in the "Lock" position, it may be inserted and removed at will because when the lever is moved outwardly, the jaw portion of the locking lever engages the cam 357 and rocks the locking pawl 351 so as to permit removal of the locking lever 329. If the locking lever 329 is turned downwardly to its "Unlock" position, as shown in Fig. 14, the wall 354 prevents the rocking of the locking pawl 351 when the locking lever is pulled outwardly and consequently the cam 357 is in the path of the jaw portion of the locking lever and prevents removal of the locking lever.

As will be explained more fully hereinafter, it is desirable to insure the maintenance of the controller handle 46 in its Trip position for a short length of time, when locking the controller handle 46 in its Non-operative position at the end of a service run or when changing ends, in order to insure the tripping of a master circuit breaker and thus prevent unnecessary drainage of current from a storage battery on the car due to the supply of current to the track brakes. For this purpose, a blocking member or idler 361 is provided, as shown in Figs. 8 and 9. The blocking member 361 is substantially triangular in shape and is pivoted at one apex on a pin 362 that is fixed at opposite ends thereof in the two disks 251 and 256 in a position parallel to the controller shaft 47.

A plunger 364 contained in a suitable bore 365, in the boss 257 between the two disks 251 and 256, is biased by a spring 370 surrounding the plunger within the bore 365 into engagement with one edge of the blocking element 361 and serves to yieldingly maintain the element against a stop pin 363 fixed to the disks 251 and 256. As will be seen in Fig. 9, the blocking member 361 is adapted to cover the slot 342 in the disk 256 when engaging the pin 363.

As will be seen in Fig. 8, the slot 341 in the disk 251 is wider than the slot 342 in the disk 256 and the relative positions of the two slots 341 and 342 in the disks is such that only when the disks 251 and 256 are in a position corresponding to Trip position of the controller handle 46 can the latch finger 339 be moved through the slot 341 into contact with the upper surface of the lower disk 256 at one side of the blocking member 361. Once the latch finger 339 is shifted downwardly, by movement of the locking lever 329 upwardly from the "Unlock" position thereof, into engagement with disk 256, further operation of the controller handle 46 from Trip position toward and into Non-operative position causes the blocking member 361 to be shifted in a clockwise direction on its pivot pin 362 so as to uncover the slot 342 in the disk 256.

It will thus be seen that it is necessary for the operator to hold the controller handle 46 stationary in the Trip position thereof momentarily, before shifting the controller handle 46 from Trip position to Non-operative position, in order to operate the locking lever 329 upwardly as far as possible at that time. This interval of time is sufficiently long to insure the proper tripping operation of the master circuit breaker on one or more units of the train.

Since as previously described, the reverser handle 288 must be in its Neutral position to place the slot 343 in the reverser disk 285 in vertical alignment with the slots 341 and 342 in the two disks 251 and 256 and thus permit the locking handle 329 to be shifted the full extent upwardly to the "Lock" position thereof, the operation of the reverser handle 288 to its Neutral position is positively insured because unless the reverser handle 288 is in its Neutral position, the locking lever cannot be removed from the controller.

As previously stated, the controller 45 further includes the self-lapping valve 48 which is arranged to be operated by rotation of the controller shaft 47. The specific manner of mounting and the structural details of the self-lapping valve 48 are shown in Figs. 2 and 11. As seen in Fig. 11, the self-lapping valve 48 has a tubular sectionalized casing comprising two cooperating upper and lower sections 371 and 372 respectively, adapted to be secured together by a plurality of screws 373.

The casing of the self-lapping valve 48 is suspended at one side of the controller shaft 47 from the upper flange 374 of a mounting bracket 375 as by a plurality of screws 376. The mounting bracket 375 has a lower flange 377 which is screwed to the base 188 of the controller 45 as by a plurality of screws 378; and two spaced webs 379, only one of which is shown in broken lines, connects the upper and lower flanges of the mounting bracket 375, the casing of the self-lapping valve 348 being disposed between the two webs 379. The lower flange 377 of the mounting bracket 375 is of substantially U-shape to permit access to the lower end of the self-lapping valve 48 through a suitable opening 379 in the base 188.

The mechanism of the self-lapping valve 48 is well-known, being standard valve mechanism commonly employed in automotive air brake equipment. Briefly, it comprises a diaphragm 381 having its peripheral edges clamped between the two casing sections 371 and 372, a hollow operating plunger 382, that operates in a suitable bore 383 in the upper casing section 371, and a coil spring 384 interposed between a shoulder formed in the hollow interior of the plunger 382 and a diaphragm follower 385 secured to the upper surface of the diaphragm 381.

The diaphragm 381 and follower 385 each have a central opening, and a bushing 386 with a flange 387 that engages the lower surface of the diaphragm 381, extends through the central opening in the diaphragm and the follower. The upper end of the bushing 386 is threaded and the central opening in the follower 385 is threaded so that the follower may be screwed over the bushing to clamp the diaphragm between itself and the flange 387 on the bushing and thus seal the central opening in the diaphragm against leakage of fluid under pressure therethrough.

A sleeve 388 having internal threads at the lower end thereof is screwed over the upper threaded end of the bushing 386, the upper end of the sleeve being flared outwardly to serve as a stop for a washer 389 slidable on the sleeve, against which washer the upper end of the coil spring 384 acts. The washer 389 cooperates with the internal shoulder on the operating plunger 382 in a manner to be engaged by the shoulder upon downward movement of the plunger 382, thereby effecting compression of the coil spring 384.

The upper end of the hollow plunger 382 is provided with a suitable circular opening for receiving the pin 391 at the lower end of a contact piece 392, suitable washer-like shims 393 being provided between the upper end of the plunger 382 and the contact piece 392 for the purpose of adjustment. The upper flange 374 of the mounting bracket 375 is provided with a suitable opening 394 through which the plunger 382 and contact piece 392 extend.

Formed at the lower side of the diaphragm 381 in the casing section 372 is a chamber 395 that is open through a suitable choke or restricted passage 396 to another chamber 397 in the casing section 372 to which a pipe 49 leading to a relay valve 51 (Fig. 15) is connected. As will be seen in Fig. 2, one section of the pipe 49 is connected to the inner end of an opening in the base 188 of the controller 45 while the external section of the pipe 49 is screwed into the outer threaded end of the opening.

The chamber 397 communicates through a port 398 with a chamber 399 that has a threaded inlet port 401 to which a fluid pressure supply pipe 41 is connected. A suitable filter 402 is provided over the inlet port 401 in the chamber 399.

Contained respectively in the chambers 397 and 399 are two ball valves 403 and 404 connected by a stem 405 of reduced diameter that extends through the port 398.

Interposed between the wall, separating the chambers 397 and 399, and the ball valve 403 is a coil spring 406 that urges the ball valves 403 and 404 upwardly to seat the valve 404.

In operation, when the plunger 382 is shifted downwardly the coil spring 384 is compressed and correspondingly urges the diaphragm 381 downwardly. In moving downwardly with the diaphragm 381 the lower end of the bushing 386 seats on the ball valve 403 and thereafter the two ball valves 403 and 404 are shifted downwardly to unseat the ball valve 404 and open the port 398.

Fluid under pressure is accordingly supplied from the supply chamber 399 past the valve 404 through the port 398 to the pipe 49 leading to the operating chamber of the relay valve 51. When the pressure built up in the operating chamber of relay valve 51, as supplied through the choke 396 and acting on the lower face of the diaphragm 381, exerts a force slightly greater than the downward force exerted by the spring 384, the diaphragm is flexed upwardly a sufficient amount to permit the spring 406 to reseat the ball valve 404 and close the port 398, thus preventing the further supply of fluid under pressure to the pipe 49, the ball valve 403 remaining seated on the lower end of the bushing 386.

It will be apparent that the valve 48 automatically operates to establish a fluid pressure in pipe 49 corresponding to the amount of downward movement of the plunger 382.

When the force on the plunger 382 is removed, the force of the spring 384 restores it to the normal position determined by the maximum outward position of the washer 389 engaging the flange on sleeve 388. In shifting upwardly to the normal position, the ball valve 403 is unseated from the lower end of the bushing 386 and the fluid under pressure in the pipe 49 is accordingly vented to atmosphere past the valve 403 through the interior passage in the bushing 386, ports 407 in the sleeve 388 and an exhaust port 408 in the wall of the casing section 371. The pressure in the chamber 395 acting on the lower face of the diaphragm 381 is correspondingly reduced through the choke 395.

Operation of the plunger 382 of the self-lapping valve 48 is effected by means of a rocker arm or frame 411 in the form of a hollow square, through the central opening of which the controller shaft 47 extends. The rocker frame 411 is pivoted on a pair of pins 412, the opposite side pieces of the rocker frame 411 being pivoted on corresponding pins 412 that are in turn carried in the upwardly projecting supporting lugs 413 (Figs. 2 and 11) integrally formed on the upper flange 374 of the mounting bracket 375. As seen in Fig. 2, additional brackets 414, attached as by bolts 415 to the side flanges of the central channel member 187, may also be provided to impart additional rigidity and support for the pivot pins 412 of the rocker frame 411, thereby insuring accurate operation of the self-lapping valve 48. A roller 417, rotatably mounted on a pin 418 secured at one end of the rocker frame 411, is adapted to engage the upper end of the contact piece 392 associated with the operating plunger 382 of the self-lapping valve 48. Another roller 419 is rotatably mounted, as by ball bearings 420, on a pin 421 fixed at the opposite end of the rocker frame 411.

Fixed, as by a pin 410, on the controller shaft 47 beneath the rocker frame 411 is a flanged collar 422 to the flange of which an annular cam member 423, having a suitable cam surface 424 thereon for cooperating with the roller 419, is secured as by one or more screws 409. In order to provide for adjustment, one or more suitable shims 425, in the form of a washer, may be interposed between the flange on the collar 422 and the cam 423.

The cam surface 424 of the cam 423 is such that upon rotation of the controller shaft 47 in a clockwise direction, as viewed from the top of the controller in Fig. 13, the rocker frame 411 is rocked in a counterclockwise direction, as seen in Fig. 11, to cause downward movement of the plunger 382 of the self-lapping valve 48, the cam surface 424 being such as to effect downward movement of the plunger 382 substantially in proportion to the amount of rotative movement of the controller shaft 47. Conversely, when the controller shaft 47 is rotatively shifted in a counterclockwise direction, as seen from the top of the controller in Fig. 13, the rocker frame 411 is rocked in a clockwise direction by the spring 384 of the self-lapping valve 48 in conformity with the cam surface 424.

It will thus be seen that as the displacement of the controller handle 46 from the Coasting position into the propulsion zone increases, the self-lapping valve 48 is operated to correspondingly increase the pressure in the pipe 49. On the other hand, when the controller handle is displaced into the braking zone from the Coasting position, the self-lapping valve 48 is operated to correspondingly decrease the pressure in the pipe 49.

The portion of the controller between the casing member 194 at the top and the base 188 at the bottom is adapted to be covered by two easily removable light-weight cover pieces 431 and 432. The lower cover piece 432 is of relatively rigid construction being preferably cast aluminum and the upper cover piece 431 is of relatively flexible sheet material, such as sheet steel. The lower cover piece 432 is provided with suitable lugs 433 on the interior wall thereof through which suitable screws 434 extend, only one being shown in Fig. 11, for securing the cover piece to the base 188. Cover piece 432 is of substantially U-shape, the open portion of the U conforming to and closed by the supporting channel member 185.

In a similar manner the upper cover piece 431 is of substantially U-shape and the open side thereof conforms to and is closed by the supporting channel 185. The cover piece 431 is removably attached to the side flanges of the channel member 185 by a suitable latch device 436 on each side thereof, only one being shown in Fig. 1, having a rotarily movable handle 437. It will thus be apparent that the cover pieces 431 and 432 may be removed in succession with great rapidity to provide complete access to the rotary cams, contact fingers and self-lapping valve of the controller.

In order to explain certain functions of the controller 45, the pneumatic connections of the controller are shown in Fig. 15. A brief description of these pneumatic connections will now be given although it should be understood that reference may be had to my Patent 2,215,356 for a complete description.

As previously indicated, the self-lapping valve 48 of the controller is operative to supply fluid under pressure from a fluid pressure supply pipe 41 to a pipe 49 leading to a relay valve 51. It should be understood that pipe 41 is connected to a reservoir, not shown, which is charged from a fluid compressor, not shown. The reservoir and supply pipe 41 are constantly charged to a certain normal pressure, such as 125 pounds per square inch.

The relay valve 51 is a super-sensitive high capacity relay valve device of well known construction and needs no specific description. The relay valve 51 is operative in response to the pressure of fluid supplied to the pipe 49 to supply fluid from the supply pipe 41 to a pipe 52 at a pressure corresponding to the pressure delivered to the pipe 49.

The pipe 52 leads through a so-called release valve device 53 and, in the normal condition of the application valve 54, to a train pipe 42, hereinafter called the control pipe. As indicated in the introduction to this specification, suitable actuator devices operatively controlled in response to the pressure in the control pipe 42 are provided for selectively operating the local braking and propulsion controllers on the different cars of a train or the different units on a multiple unit train.

The release valve 53 is described in detail in my Patent 2,215,356 and accordingly reference may be had thereto for a complete description. Briefly, the release valve comprises a one-way or check valve, which is biased by a spring to a seated position, and a piston which is effective when subjected to fluid under pressure on one side thereof to unseat the check valve. The check valve is so arranged that when seated it prevents back flow of fluid under pressure from the application valve 54 to the relay valve 51 but unseats in response to the supply of fluid under pressure from the relay valve to the application valve. When the piston is subjected to fluid under pressure and unseats the check valve, fluid under pressure may flow through the release valve 53 in either direction between the application valve and the relay valve.

The application valve 54 is well known and should require no description. For a complete description of the structure and the operation of the application valve reference may be had to my Patent 2,215,356. Briefly, the application valve 54 comprises a vent valve, in the form of a piston valve, an operating piston for the vent valve in which piston is a restricted port, and a spring for urging the piston in a direction to seat the vent valve. In its seated position, the vent valve establishes communication between the pipe 52 and the control pipe 42. Fluid under pressure supplied through the pipe 52 to the control pipe 42 accordingly acts on the under side of the piston and flows at a restricted rate through the restricted port of the piston to charge a chamber above the piston, to which chamber the pipe 336 is connected. If the pressure of the fluid above the piston is suddenly reduced, the consequent differential fluid pressure force exerted on the piston raises it so as to cause shifting of the vent valve to a position interrupting the communication between the pipe and the control pipe 42 and establishing a connection between the control pipe 42 and an exhaust port through which fluid under pressure in the pipe 42 is rapidly exhausted to atmosphere.

Operation of the application valve 54 and the release valve 53 is effected by means of the magnet valve 55. Briefly the magnet valve 55 comprises an exhaust valve 479 of the poppet type which is urged in a direction to be unseated by a spring 485 and which is operated in the opposite direction to a seated position on an associated valve seat upon energization of a solenoid winding 484. Magnet valve 55 further comprises two switch contact members 481 and 482 which are operated from open position thereof to closed position thereof in response to energization of the solenoid winding 484 and returned to open position upon deenergization of the solenoid winding. The contact member 481 is effective in its closed position to establish a self-holding circuit for the solenoid winding 484. The contact member 482 serves to establish a so-called emergency circuit which is effective upon interruption to cause application of the magnetic track brakes to their maximum degree independently of the local brake controllers.

The self-holding circuit of the solenoid 484 of magnet valve 55 includes various switch devices among which are the deadman switch 242 of the controller, a track trip switch, not shown, conductor's switches, not shown, and the switch contact finger 271q of the controller. Upon operation of any of these switch devices to interrupt the self-holding circuit thereof, the solenoid winding 484 is deenergized and the valve 479 consequently unseated. When unseated, the valve 479 exhausts fluid under pressure from the pipe 335 and a branch pipe 453 thereof leading to the pressure chamber associated with the operating piston of the release valve 53, to atmosphere through an exhaust port 491.

Since the contact finger 271q of the controller is operated to open position when the controller handle 46 is shifted into its Non-operative position it will be seen that during the "locking" operation of the controller, the exhaust valve 479 of the magnet valve 55 is correspondingly unseated to exhaust fluid under pressure from the operating piston of the release valve 53 to cause seating of the check valve thereof. When the locking lever 329 of the controller is shifted fully to its upper or "lock" position, the port 334 in the plug valve 326 operated by the locking lever 329 is correspondingly shifted to a position interrupting the connection between the pipes 335 and 336. Thus, if the operator shifts the locking lever 329 promptly to its "lock" position after the controller handle 46 reaches its Non-operative position, the unseating of the valve 479 of the magnet valve 55 will not be effective to continue to reduce the pressure of the fluid in the chamber above the operating piston of the application valve 54.

If the locking lever 329 remains in its "unlock" position upon the unseating of the valve 479 of the magnet valve 55, which would be the case in the event of operation of the deadman switch 42, track trip switch or a conductor's switch, the unseating of the valve 479 also effects the exhaust of fluid under pressure of the operating piston of the application valve piston 54. In such case the vent valve of the application valve 54 is operated to exhaust fluid under pressure from the control pipe 42. This results in the operation of the local brake controllers to cause the maximum degree of application of the dynamic, magnetic track and fluid pressure controlled brakes.

It will accordingly be seen that when a controller is not in use and the locking lever 329 thereof is removed, the release valve 53 is automatically conditioned to prevent the supply of fluid under pressure from the control pipe 42 to the relay valve 51. This is necessary because, with the controller handle in Non-operative position, the relay valve 51 is effective to establish a low pressure in pipe 42 corresponding to the low pressure for effecting a full service application of the brakes. In order to enable the control of pressure in the pipe 42 by the controller at the opposite end of the train, therefore, it is necessary to close the end of the control pipe 42 at the control station having the controller not in use. It will be apparent that the operation of the plug valve 326 to a position interrupting the connection between the pipes 335 and 336 enables the application valve 54 to be restored to its normal position when the controller handle at the associated control station is locked in its Non-operative position although the magnet valve 55 remains effective to exhaust fluid under pressure from the operating piston of release valve 53.

*Operation*

Let it be assumed that the car is stopped and that the controller handle 46 is depressed so as to close the "deadman" switch 242, while in the Coasting position, and that the reverser handle 238 is in its Forward position. In order to cause propulsion of the car, the operator merely shifts the controller handle 46 to a desired position in the propulsion zone. The self-lapping valve 48 of the controller is accordingly operated, in the manner previously described, to effect an increase from the normal pressure in the control pipe 42 to a pressure corresponding to the propulsion position to which the controller handle is moved. The actuators, not shown, on the several units or cars are operative in response to the increased pressure in the control pipe 42 to shift the local propulsion controller to a position corresponding to the position of the controller handle 46. At the same time, certain of the contact fingers operated by the rotary cams 270 become effective to establish, in cooperation with the local propulsion controller, the necessary circuits for causing the supply of power to the propulsion motors of the car. The car or train is accordingly accelerated and propelled at a speed corresponding to the propulsion position of the controller handle.

When the operator desires to effect an application of the brakes to bring the car to a stop, he merely shifts the controller handle 46 back through Coasting position into the braking zone an amount corresponding to the desired degree of application of the brakes. The self-lapping valve 48 is accordingly operated to cause a reduction of the pressure in the control pipe 42 and the several actuators correspondingly cause the return of the associated local propulsion controllers to "power-off" position and the operation of the local braking controllers to a brake position corresponding to the position of the controller handle 46.

The normal zone of movement of the controller handle 46 to effect braking is between the Coasting position and the Full service position because the blocking lever 231 operated by the push-button 235 is normally effective to prevent movement of the controller handle beyond the Full service position.

To release the brakes, the operator merely restores the controller handle 46 to Coasting position in which the self-lapping valve 48 of the controller is effective to cause the restoration of the pressure in the control pipe 42 to the normal pressure carried therein. With the normal pressure reestablished in the control pipe 42, the several actuators controlled by the pressure in the pipe 42 restores their associated local braking controllers to the brake release position.

It will thus be seen that by employing a single controller handle which is effective to control propulsion at one time and braking at another time, the proper coordination of the local braking and propulsion controllers is automatically secured.

Let it now be assumed that with the car stopped and the controller handle 46 in full service position the operator desires to leave the car or to "change ends," that is, to employ the controller at the opposite end of the car or train. In order to render the controller at the opposite end of the car or train operative, it is first necessary for the operator to remove the locking lever or handle 329 from the first controller because only one lever 329 is provided.

In order to remove the locking lever 329 from the controller, the operator is automatically compelled to perform certain operations due to the construction of the controller in accordance with my invention. As previously indicated, the locking lever 329 cannot be shifted from the "unlock" position to the "lock" position thereof unless the controller handle is in its Non-operative position and the reverser handle is in its Neutral position. Thus the operator must first shift the controller handle 46 toward the Non-operative position. In order to pass the Full service position the operator must first depress the push-button 235, thus allowing the controller handle to move into its Trip position. As will be explained presently, the operator must stop the controller handle in its Trip position and not shift it continuously to the Non-operative position.

Holding the controller handle 46 depressed in its Trip position, the operator now grasps the locking lever 329 and pulls it upwardly as far as it will go. The release of the controller handle 46 and the consequent opening of the "deadman" switch 242 at this time would be effective to interrupt the self-holding circuit of the solenoid winding 484 of magnet valve 55 because contact finger 271h of the controller is open in the Trip position of the controller handle 46. The continued depression of the controller handle 46 while in Trip position prevents such deenergization of the winding 484 of magnet valve 55, however. As previously explained, with the controller handle 46 in its Trip position, the latch 338 may be shifted through the slot 341 in the uppermost disk 251 into engagement with the upper surface of the intermediate disk 256 alongside the blocking member 361. Thus, the locking lever 329 can be shifted only part way back to the "lock" position thereof from the "unlock" position while the controller handle 46 remains in its Trip position.

The time required for the operator to grasp the locking lever 329 and pull it upwardly as far as possible insures a desired operation, namely the energization of the trip coil of the several master circuit-breakers on the cars or units to trip the circuit breakers to their open position. As previously indicated, the master circuit-breakers are effective, when opened, to interrupt the supply of current from the local storage battery on the same unit or car to the magnetic track brakes on the same unit or car. After shifting the locking lever 329 upwardly toward the "lock" position as far as possible with the controller handle 46 held depressed in its Trip position, the operator thereafter shifts the controller handle to its Non-operative position. As previously explained, the blocking member 361 is thus shifted to uncover the slot 342 in the intermediate disk 256. With the controller handle 46 in its Non-operative position, the reverser handle is unlocked for movement to the Neutral position thereof.

Before being able to shift the locking lever 329 completely to its "lock" position, it is necessary for the operator to shift the reverser handle 288 from the Forward position (or the Reverse position if it is in the Reverse position) to the Neutral position thereof.

As previously explained, the slots 341, 342, and 343 in the three disks 251, 256, and 285 are placed in vertical alignment when the controller handle and the reverser handle are respectively in their Non-operative and Neutral positions. Thus, the operator may again grasp the locking lever 329 and pull it farther upwardly into the "lock" position thereof. It will be apparent that in shifting the locking lever 329 to the "lock" position thereof, the latch 338 is rocked sufficiently in a counterclockwise direction, as seen in Fig. 1, so that the finger 339 thereon engages in all of the slots 341, 342, and 343, thereby locking the controller handle in its Non-operative position and the reverser handle in its Neutral position.

Once the locking lever 329 is shifted into the "lock" position thereof, it may be removed by pulling it outwardly.

If the operator shifts the controller handle 46 rapidly through the Trip position to its Non-operative position without stopping it momentarily in the Trip position to pull the locking lever 329 upwardly as far as possible at that time, it will be impossible for the operator to subsequently remove the locking lever from the controller in the manner described. This is so because the blocking member 361 will not, in such case, have been shifted to uncover the slot 342 in the disk 256 and consequently the movement of the locking lever into its "lock" position will be prevented. The arrangement I have provided accordingly compels the operator to hold the controller handle 46 momentarily stationary in its Trip position as a pre-requisite to the removal of the locking lever 329.

As previously explained, with the controller handle 46 in its Non-operative position, the contact finger 271q is operated to its open position, thereby interrupting the circuit for energizing the solenoid winding 434 of the magnet valve 55 and resulting in the unseating of the exhaust valve 479. Due to the fact that the plug valve 326 interrupts the connection between the pipes 335 and 336, when the locking lever 329 is in its "lock" position, the magnet valve 55 is, therefore, effective to exhaust fluid under pressure from the operating piston of the release valve 53 but not from the chamber above the operating piston of the application valve 54. During the interval of time elapsing between the time that the controller handle 46 reaches its Non-operative position and the time that the operator shifts the locking lever 329 to its "lock" position, fluid under pressure may be released from the chamber above the operating piston of the application valve 54. However, if the locking lever 329 is shifted promptly to its "lock" position this release of fluid under pressure is likewise promptly terminated. Accordingly, the application valve 54 is ordinarily not operated to exhaust fluid under pressure from the control pipe 42 while the controller is being locked. Should the application valve 54 be operated to vent fluid under pressure from the control pipe, it is promptly restored to its normal position whenever the locking lever 329 reaches its "lock" position.

Due to the exhaust of the fluid under pressure from the operating piston of the release valve 53, the check valve of the release valve is caused to seat. Thus, when the pressure in the control pipe 42 is subsequently increased under the control of the controller at the opposite end of the car or train, the end of the control pipe 42 is closed by the check valve of the release valve 53.

It will be understood, particularly by reference to my prior Patent 2,215,356, that with the operating handle 46 of the controller 45 at the head-end station locked in its Non-operative position, the fluid pressure controlled spring-applied brakes associated with the wheels of the various units or cars of the train remain applied to a degree corresponding to that effected in the full service position of the controller handle. This is so because when the controller handle is shifted beyond the full service position thereof to its Trip and Non-operative positions, as seen in Fig. 13, the fluid pressure in the pipe 42 continues to remain at the low pressure effected in the full service position of the controller handle. Thus, when the train is stopped for an indefinite time, as when temporarily out of service, the fluid pressure controlled brakes throughout the train continue to remain applied to a degree corresponding to that effected in the full service position of a controller handle because the operating handle 46 of the master controllers at both head-end and rear-end control stations of the train are locked in their Non-operative positions. The release of the brakes may be subsequently effected by restoring the handle 46 of the master controller at either the head-end or rear-end control stations to its Coasting position, as will be presently described.

Let it now be assumed that having locked the controller and removed the locking lever 329, the operator subsequently desires to install the locking lever on the same or a different controller and unlock the controller for operation. To unlock a controller for operation, the operator first inserts the locking lever 329 in the slot 358 at the side of the controller casing and shifts it downwardly from "lock" position to "unlock" position, as indicated in Figs. 1 and 14. As will be observed in Fig. 1, the latch finger 339 is thus shifted to the position in which it clears the uppermost disk 251 and frees the controller handle 46 and reverser handle 288 for operation.

Before attempting to shift the controller handle out of its Non-operative position, the operator must first shift the reverser handle 288 to either the Forward or the Reverse position thereof as desired. It will be apparent that such is the case because only in the Non-operative position of the controller handle 46 does the cam 307 on the intermediate disk 256 engage the roller 306 on the lever 305 to shift the locking finger 304 out of the notches 303 in the reverser disk 285.

If the operator does not shift the reverser handle 288 out of its Neutral position to either its Forward or Reverse position before shifting the controller handle 46 out of its Non-operative position back toward the Coasting position thereof, it will be impossible for him to shift the controller handle 46 beyond the Coasting position into the propulsion zone. Thus unless the reverser handle 288 is in either the Forward or the Reverse positions thereof it is impossible for the operator to start the car.

It will be apparent from Fig. 9 that with the reverser disk 285 in the position corresponding to the Neutral position of the reverser handle 288, the lug 313 on the lever 311 is in the path of movement of the shoulder 314 on the intermediate disk 256 and, as previously explained, thus prevents the movement of the controller handle 46 from Coasting position into the propulsion zone.

It will thus be seen that I have provided mechanism for so interlocking the reverser and controller handles as to insure the proper and coordinated operation thereof.

Assuming that the operator has shifted the reverser handle 288 to either the Forward or the Reverse position thereof, he may thereafter shift the controller handle 46 to its Coasting position in readiness for starting the car. When the controller handle 46 is shifted from its Non-operative position to its Coasting position, the previously mentioned self-holding circuit for solenoid winding 484 of the magnet valve 55 is established in the manner described in detail in my Patent 2,215,356. The valve 479 of the magnet valve 55 is accordingly seated so that fluid under pressure supplied from the pipe 336 to the pipe 335 through the plug valve 326 of the controller is effective to build-up a pressure on the operating piston of the release valve 53 and thus effect unseating of the check valve thereof. With the check valve of the release valve 53 unseated, the operation of the controller handle out of its Coasting position into either the braking or propulsion zone is effective through the self-lapping valve 48 to control the operation of the relay valve 51 which, in turn, correspondingly varies the pressure in the control pipe 42. It will thus be seen that the operation of the locking lever 329 to the "unlock" position not only permits operative movement of the controller handle but by controlling the operation of the release valve 53 renders the operation of the controller handle effective to control the pressure in the control pipe 42.

It will be apparent that with the controller handle 46 in its Coasting position, the pressure in the pipe 42 is restored to its corresponding value. Thus the actuators on the different units of the train operate in response to the pressure in the pipe 42 to restore the local braking controllers on the units to their brake release positions to effect the release of the fluid pressure controlled spring-applied brakes.

*Summary*

Summarizing, it will be seen that I have provided a combined braking and propulsion controller of the pedestal type including a master reverser. The controller has a controller handle which has a central position called the Coasting position and is effective when shifted to one side of the Coasting position to cause propulsion of the car or train and when shifted to the opposite side of the Coasting position to cause braking of the car or train.

The reverser includes a reverser handle which has a Neutral position and which is shiftable to one side of the Neutral position to a Forward position and to the opposite side of Neutral position to a Reverse position.

The controller handle and the reverser handle are not removable in service but are locked respectively in a Non-operative position and the Neutral position thereof respectively by means of a locking lever or handle which is removable only in a "lock" position thereof.

My present invention comprises mechanism for so coordinating the operation of the controller handle, the reverser handle, and the locking lever that proper conditioning and operation thereof is assured. These various features for coordinating the operation of the controller handle, the reverser handle and the locking lever are enumerated in the introduction and need not be here repeated.

While I have disclosed only one specific embodiment of the controller constituting my invention, it will be understood that various omissions, additions or modifications may be made therein without departing from the spirit of my invention.

Having now described my invention, what I claim as new and desire to secure by Letters Patent, is:

1. A controller device comprising a rotary operating shaft, an element fixed for rotation at all times with said shaft and adapted to be moved slidably along said shaft in an axial direction, said element having a portion projecting radially from said shaft, a pair of fixed stop members arranged in spaced angular relation, means formed on the projection of the said element for engaging one of said fixed stop members to limit the rotary movement of said shaft in one direction and for engaging the other of said stop members for limiting the rotary movement of the shaft in the opposite direction, resilient means for biasing the said element in an axial direction along the shaft to a certain position, an operating handle secured to the said shaft in a manner to rotate the shaft to different operating positions thereof and to shift the said element axially against the force of said biasing means to a second position upon the manual application thereto of a force in opposition to said biasing means, and a switch device having a switch operating arm cooperating with the projection on said element whereby operation of said switch device is effected in response to axial movement of said element along said shaft.

2. A controller device comprising a rotary operating shaft adapted to be shifted rotarily to any one of a plurality of positions, a second operating shaft adapted to be shifted rotarily to any one of a plurality of positions, and a locking element associated with both of said shafts and operative to a position for locking both of said shafts against rotary operative movement only when the first said shaft is in one certain position thereof and the second said shaft is in one certain position thereof.

3. A controller device comprising a rotary operating shaft adapted to be shifted rotarily to a plurality of operating positions and to a nonoperative position, a second operating shaft in the form of a sleeve concentrically surrounding the first said shaft and through which the first said shaft extends, said second shaft being adapted to be rotarily shifted to a plurality of different positions independently of rotation of the first said shaft, and locking means associated with said first and said second shafts in a manner to lock both of said shafts against operative movement only when the first said shaft is in its non-operative position and the second said shaft is in one certain position thereof.

4. A controller device comprising a rotary operating shaft adapted to be shifted rotarily to any one of a plurality of positions, a second operating shaft adapted to be shifted rotarily to any one of a plurality of positions, a locking element associated with both of said shafts and operative to a position for locking both of said shafts against rotary operative movement only when the first said shaft is in one certain position thereof and the second said shaft is in one certain position thereof, a removable handle for operating said locking element into and out of its locking position, and means for preventing removal of said handle except when the locking element is in its locking position.

5. A controller device comprising a rotary operating shaft adapted to be rotarily shifted consecutively through a plurality of different operating positions to a non-operative position, locking means for locking said operating shaft in its non-operative position, an operating handle for the locking means effective in one position to cause the locking means to unlock the shaft and effective in another position to cause the locking means to lock the shaft against movement, and means effective to prevent movement of the hande from its unlocking position to its locking position unless the said operating shaft is stopped in one certain operating position thereof and the operating handle of the locking means then operated part of the way toward its locking position before the operating shaft is further shifted to the non-operative position thereof.

6. A controller device comprising a rotary operating shaft adapted to be rotarily shifted successively through a plurality of different operating positions to a non-operative position, a pair of disks fixed in spaced parallel relation on said shaft and rotatable therewith at all times, said disks having openings therein respectively that are in partial registry with each other, a blocking member disposed between said disks in a manner to normally cover the opening in one of said disks, a locking element adapted to be moved through the opening in the other of said disks into contact with the said one disk when the operating shaft is in a certain operating position thereof, said blocking member being engageable by the said locking element in the said certain operating position of the operating shaft and shiftable thereby in response to the further movement of the operating shaft to its non-operative position to uncover the opening in the said one disk whereby to permit movement of the locking element through the opening in the said one disk.

7. A controller device comprising a rotary operating shaft adapted to be shifted rotarily consecutively through a plurality of different operating positions to a non-operative position, a pair of disks fixed in spaced parallel relation on said shaft and rotatable therewith at all times, said disks having openings therein respectively that are in partial registry with each other, locking means including a latch member and a removable operating handle therefor, the latch member being effective to clear the said disks in one position of the handle to permit operative movement of the operating shaft and adapted upon movement of the operating handle toward a second position to pass successively through the opening in one of said disks and then the other of said disks, and a blocking member disposed between said disks in a manner to normally cover the opening in the said other disk, the latch member being adapted to cooperate with said blocking member in a manner to shift the blocking member to uncover the opening in the other of said disks only when the operating shaft is stopped in a certain operating position thereof and the operating handle of the locking means shifted partially toward the locking position thereof before further shifting of the operating shaft to its non-operative position.

8. A controller device comprising a rotary operating shaft adapted to be shifted rotarily consecutively through a plurality of different operating positions to a non-operative position, a pair of disks fixed in spaced parallel relation on said shaft and rotatable therewith at all times, said disks having openings therein respectively that are in partial registry with each other, locking means including a latch member and a removable operating handle therefor, the latch member being effective to clear the said disks in one position of the handle to permit operative movement of the operating shaft and adapted upon movement of the operating handle toward a second position to pass successively through the opening in one of said disks and then the other of said disks, a blocking member disposed between said disks in a manner to normally cover the opening in the said other disk, the latch member being adapted to cooperate with said blocking member in a manner to shift the blocking member to uncover the opening in the other of said disks only when the operating shaft is stopped in a certain operating position thereof and the operating handle of the locking means shifted partially toward the locking position thereof before further shifting of the operating shaft to its non-operative position, and means for preventing removal of the operating handle of the locking means unless the latch member of the locking means has been received in the opening of the other of said disks.

9. A controller device for a vehicle brake and motor control system comprising a rotary operating shaft adapted to be shifted rotarily to a plurality of different operating positions and to a non-operative position, control means effective in the different operating positions of the operating shaft to selectively effect braking and propulsion of the vehicle, a second operating shaft shiftable rotarily to a forward, a reverse and a neutral position, means controlled according to the forward and reverse positions of the said second shaft for controlling the direction in which the motors propel the vehicle, a disk fixed on the first shaft, a disk fixed on the second shaft in parallel spaced relation to the first said disk, said disks having openings therein adapted to register with each other only when the first said shaft is in its non-operative position and the said second shaft is in its neutral position, and a locking element adapted to be moved into and out of said openings for locking and unlocking both of said shafts simultaneously.

10. A controller device for a vehicle brake and motor control system comprising a rotary operating shaft adapted to be shifted rotarily to a plurality of different operating positions and to a non-operative position, control means effective in the different operating positions of the operating shaft to selectively effect braking and propulsion of the vehicle, a second operating shaft shiftable rotarily to a forward, a reverse and a neutral position, means controlled according to the forward and reverse positions of the said second shaft for controlling the direction in which the motors propel the vehicle, a disk fixed on the first shaft, a disk fixed on the second shaft in parallel spaced relation to the first said disk, said disks having openings therein adapted to register with each other only when the first said shaft is in its non-operative position and the said second shaft is in its neutral position, a locking element adapted to be moved into and out of said openings for locking and unlocking both of said shafts simultaneously, a removable handle for shifting the said locking element into and out of the openings in said disks, and means for preventing removal of said handle except when the locking element is received in the openings of both said disks.

11. A controller device for controlling motors comprising a rotary operating shaft adapted to be rotarily shifted into a plurality of operating positions and into a non-operative position, a rotary reverser shaft adapted to be shifted to a forward, a reverse or neutral position to control the direction of rotation of the motor, a first disk and a second disk fixed in spaced parallel relation on said operating shaft, a third disk fixed on said reverser shaft in spaced parallel relation to the said second disk, said first and second disks having openings therein which are in partial register and the third disk having an opening therein adapted to be moved into register with the openings in the first and second disks when the operating shaft is in its non-operative position and the reverser shaft is in its neutral position, a locking element adapted to be moved successively through the openings in the first, second and third disks for simultaneously locking the operating shaft and the reverser shaft against movement, and a blocking member adapted to cover the opening in the said second disk to prevent the movement of the locking element therethrough, said locking element being effective if moved into the opening of said first disk while the operating shaft is stopped in a certain operating position thereof to engage the blocking member and shift it in a direction to uncover the opening of said second disk in response to the further movement of the operating shaft to its non-operative position whereby to permit the locking element to be moved thereafter through the opening in said second disk and the opening in said third disk.

12. A controller device for controlling motors comprising a rotary operating shaft adapted to be rotarily shifted into a plurality of operating positions and into a non-operative position, a rotary reverser shaft adapted to be shifted to a forward, a reverse or a neutral position to control the direction of rotation of the motor, a first disk and a second disk fixed in spaced parallel relation on said operating shaft, a third disk fixed on said reverser shaft in spaced parallel relation to the said second disk, said first and second disks having openings therein which are in partial register and the third disk having an opening therein adapted to be moved into register with the openings in the first and second disks when the operating shaft is in its non-operative position and the reverser shaft is in its neutral position, a locking element adapted to be moved successively through the openings in the first, second and third disks for simultaneously locking the operating shaft and the reverser shaft against movement, a blocking member adapted to cover the opening in the said second disk to prevent the movement of the locking element therethrough, said locking element being effective if moved into the opening of said first disk while the operating shaft is stopped in a certain operating position thereof to engage the blocking member and shift it in a direction to uncover the opening of said disk in response to the further movement of the operating shaft to its non-operative position whereby to permit the locking element to be moved thereafter through the opening in said second disk and the opening in said third disk, a removable operating handle for shifting said locking element into and out of the openings in said disks, said handle having one position in which the locking element clears all of the disks to permit the operative movement of both said shafts and another position in which the locking element engages in the openings of all three disks, and means preventing removal of the operating handle of the locking element unless the locking element engages in the openings of all three of said disks.

13. A controller device comprising a rotary operating shaft, a rotary reverser shaft, means for locking said reverser shaft against operative movement, means effective in only one certain position of the operating shaft for causing the locking means to unlock the reverser shaft, and additional means for locking said reverser shaft against rotary movement while said operating shaft is in its said one certain position.

14. A controller device comprising an operating shaft adapted to be rotarily shifted into a plurality of operating positions and a non-operative position, a rotary reverser shaft adapted to be shifted into a forward, a reverse and a neutral position, and means controlled by rotation of the operating shaft for locking the reverser shaft in any of its three positions except when the operating shaft is in its non-operative position.

15. A controller device comprising a rotary operating shaft adapted to be shifted rotarily over an operating zone between two extreme positions, a rotary reverser shaft adapted to be shifted into a forward, a reverse and a neutral position, and means effective while the reverser shaft is in its neutral position for preventing operative movement of the operating shaft in one direction beyond a certain position between the two extreme positions.

16. A controller device for a vehicle brake and motor control system, comprising a rotary operating shaft having a certain position thereof in which the brakes are released and propulsion stopped and rotarily shiftable in one direction from the said certain position to effect braking and in the opposite direction from the said certain position to effect propulsion, a rotary reverser shaft having a forward, a reverse and a neutral position, and means operatively controlled by the rotary movement of the reverser shaft and cooperatively associated with the operating shaft in a manner to prevent the operative movement of the operating shaft out of its said certain position in a direction to effect propulsion unless the reverser shaft is out of its neutral position and in either the forward or reverse positions thereof.

17. A controller device having a rotary operating shaft, a handle for rotarily shifting said shaft to different operative positions thereof, resilient means adapted to normally bias the shaft to a certain intermediate position and effective to yieldingly resist rotary movement of the shaft in opposite directions out of the intermediate position, and fixed stop means on opposite sides of the intermediate position adapted to engage and hold the operating handle and the shaft in certain predetermined positions displaced from the intermediate position on either side thereof.

18. A controller device having a rotary operating shaft, a handle hingedly connected to said shaft in a manner to effect rotary movement thereof, a fixed member having two spaced grooves and an intermediate groove, a first resilient means for biasing said handle into said grooves, and a second resilient means so constructed and arranged as to bias the rotary operating shaft normally to a position in which the handle engages in the intermediate groove and adapted to yieldingly resist rotary movement of the shaft in opposite directions from the intermediate groove to automatically restore the shaft to a position corresponding to the engagement of the handle in the intermediate groove unless the handle is moved positively into either of said grooves on opposite sides of the intermediate groove.

19. A controller device comprising a rotary operating shaft, an operating handle for rotarily shifting said shaft out of a certain position in opposite directions, a pair of crossed levers pivoted on a common fixed pivot intermediate the ends thereof, a tension spring arranged between said levers on one side of the pivot point of said levers in a manner to urge the ends of the levers on the opposite side of the pivot toward each other, a fixed stop adapted to be engaged on opposite sides by the last said ends of said levers, a projection on said shaft effective to engage one or the other of said levers upon rotary movement of said shaft out of its said certain position whereby the said tension spring yieldingly resists rotary displacement of the shaft out of its said certain position in either direction, and fixed stop means engageable with said operating handle for holding the handle and shaft in displaced positions on opposite sides of the said certain position.

20. A brake and motor controller device comprising a rotary operating shaft for selectively controlling brakes and a motor, a rotary reverser shaft for controlling the direction of rotation of the motor, means for locking said reverser shaft against operative movement, and means effective in only one certain position of the operating shaft, in which the brakes are applied, for causing the locking means to unlock the reverser shaft.

21. A brake and motor controller device comprising a rotary operating shaft having one certain position in which the release of the brakes and the deenergization of the motor is effected, said shaft being rotarily shiftable in one direction from said certain position into a first zone to effect energization of the motor and rotarily shiftable in the opposite direction from said certain position through a second or brake application zone to a non-operative position, a rotary reverser shaft for controlling the direction of rotation of the motor, means for locking said reverser shaft against operative movement, and means effective in only the non-operative position of the operating shaft for causing the locking means to unlock the reverser shaft.

22. A brake and motor controller device comprising an operating shaft having a coasting position in which the brakes are released and the motor deenergized, said shaft being shiftable rotarily in one direction out of the coasting position to effect energization of the motor and shiftable rotarily in the opposite direction out of the coasting position progressively through a plurality of braking positions to a non-operative position, a rotary reverser shaft rotarily shiftable into a forward, a reverse, or a neutral position, and means controlled by rotation of the operating shaft for locking the reverser shaft in any of its positions except when the operating shaft is in its non-operative position.

23. A brake and motor controller device comprising a rotary operating shaft having a coasting position in which the brakes are released and the motor deenergized, said shaft being shiftable rotarily in one direction out of the coasting position to effect energization of the motor and shiftable rotarily in the opposite direction out of the coasting position to effect application of the brakes, a rotary reverser shaft rotarily shiftable into a forward, a reverse, or a neutral position, and means controlled by rotation of the reverser shaft and effective while the reverser shaft is in its neutral position for preventing rotary movement of the operating shaft out of its coasting position to effect energization of the motor.

24. A brake and motor controller device comprising an operating handle having a coasting position in which the brakes are released and the motors deenergized, said handle being shiftable in one direction out of the coasting position to effect energization of the motor and in the opposite direction out of the coasting position to effect application of the brakes, a reverser handle operative into a forward, a reverse, and a neutral position for controlling the direction of rotation of the motor, and means effective while the reverser handle is in its neutral position for preventing operative movement of the operating handle out of its coasting position in a direction to effect energization of the motor.

ELLIS E. HEWITT.